United States Patent [19]
Naito

[11] Patent Number: 4,821,227
[45] Date of Patent: Apr. 11, 1989

[54] PLESIOCHRONOUS MATCHING APPARATUS

[75] Inventor: Yushi Naito, Amagasaki, Japan

[73] Assignee: Mitsubishi Denki Kabushiki Kaisha, Tokyo, Japan

[21] Appl. No.: 767,192

[22] Filed: Aug. 19, 1985

[30] Foreign Application Priority Data

Aug. 18, 1984 [JP] Japan ............... 59-172031

[51] Int. Cl.⁴ .............. G06F 13/00; G06F 11/20
[52] U.S. Cl. ............................................. 364/900
[58] Field of Search ... 364/200 MS File, 900 MS File

[56] References Cited

U.S. PATENT DOCUMENTS

| | | | |
|---|---|---|---|
| 3,909,795 | 9/1975 | Chang et al. | 364/200 |
| 4,076,964 | 2/1978 | Henrion et al. | 370/100 |
| 4,358,823 | 11/1982 | McDonald et al. | 364/200 |
| 4,429,386 | 1/1984 | Graden | 370/100 |

FOREIGN PATENT DOCUMENTS 3151207  7/1982  Fed. Rep. of Germany .
2066627  7/1981  United Kingdom .

Primary Examiner—Gareth D. Shaw
Assistant Examiner—Christina M. Eakman
Attorney, Agent, or Firm—Lowe, Price, Leblanc, Becker & Shur

[57] ABSTRACT

A plesiochronous matching apparatus has a redundant system including two equipments of the same structure, that is, an on-line equipment (the reference character thereof being accompanied by "a") and a non on-line equipment (the reference character thereof being accompanied by "b"). When the on-line equipment (a) operates normally, the non on-line equipment (b) is made to synchronize with the on-line equipment (a), so that the non on-line equipment (b) is brought into a standby state. Immediately after that, the synchronization connection is dissolved and the non-on-line equipment operates independently of the on-line equipment. The above stated synchronization connection and the dissolution thereof are performed by a synchronization control circuit (57).

12 Claims, 4 Drawing Sheets

PLESIOCHRONOUS MATCHING APPARATUS

BACKGROUND OF THE INVENTION

1. Field of the Invention

This invention relates to a redundant system of a plesiochronous matching apparatus for correcting a difference between the transmitting speeds of two digital signal systems transmitting and receiving a signal therebetween, the two digital signal systems having clock frequencies of accuracy within the range of $\pm 1 \times 10^{-11}$, as defined in the Recommendation G.8111 of the Comité Consultatif International Telegraphique et Telephonique (CCITT).

2. Description of the Prior Art

A plesiochronous matching apparatus corrects, as described above, a difference between the transmitting speeds of two digital signal systems having an extremely small difference in the permissible clock frequencies. For this purpose, this apparatus matches the data transmitting speeds of the two systems by reading and discarding or reading twice a digital data signal corresponding to a given period of time when the total of the difference of the transmission bits of the two systems attains a predetermined value.

FIG. 1 illustrates a concept of a plesiochronous matching apparatus. As shown, a plesiochronous matching apparatus is compared imaginarily to a memory having the shape of a ring. An input signal is written in this memory as write data, while read data is taken out from the memory as an output signal. In FIG. 1, the ring shaped memory has the total number N of addresses from the address 0 to the address N−1. In the state shown, an input signal is written in the address W as write data and an output signal is read out from the address R as read data. In FIG. 1, the writing order and the reading order respectively proceeds clockwise.

When the data transmitting speed of the system on the input side is equal to the data transmitting speed of the system on the output side, a fixed distance is maintained in the relative positional relation between a write address and a read address in any position of the ring shaped memory. As a result, data is read out always from the address coming afterwards by W-R addresses from the write address.

However, if there is a difference between the data transmitting speed of the system on the input side and that of the system on the output side, the relative distance between a related write address and a related read address changes as the time proceeds. If the data transmitting speed on the input side is faster than that on the output side, a write address approaches and finally overtakes a read address. On the contrary, if the speed on the input side is slower than that on the output side, a read address approaches and finally overtakes a write address.

Let us consider this phenomenon with regard to the addresses on the read side. If the data transmitting speed of the system on the input side is faster than that of the system on the output side, advance is made along the write addresses as the time proceeds and a write address approaches a read address clockwise. On the contrary, if the data transmitting speed of the system on the input side is slower than that of the system on the output side, delay is made along the write addresses as the time proceeds and a write address approaches a read address counterclockwise. The distance between a write address and a read address decreases according to the passage of the time and if the operation is left continuing, a write address and a read address will coincide with each other and finally a write address will get ahead of a read address. This means that the data for one round of a ring buffer is read and discarded in case where the write speed is relatively faster than the read speed. This means also that in case where the read speed is relatively faster on the contrary, the data already read corresponding to one cycle of a ring buffer is read out again.

Since there is a difference between the data transmitting speed on the input side and that on the output side, discarding or rereading of data in any form cannot be avoided. However, if there is no regularity in the range of the data discarded or reread, much inconvenience is caused in signal processing. Therefore, a plesiochronous matching apparatus provides a control operation so that a unit for discarding or rereading data may be a fixed unit defined according to predetermined regularity.

As the fixed unit, a unit having fixed periodical characteristic such as a sample unit, a frame unit or a multi-frame unit in a digital signal for PCM telephone line is commonly selected.

Referring to FIG. 1, it is assumed for example that the unit for slip control for discarding or rereading is equal to the data for J addresses corresponding to the data for one frame, and that the threshold for detecting the approach of write and read addresses for slipping of data is equal to a difference of 2 addresses. It is also assumed that the write speed is faster than the read speed and that the write address approaches the read address clockwise.

Now, let us consider that the write address approaches the address R-3 when the read address is at the last address R-1 of a certain frame and is only two addresses ahead of the write address. Although the read address advances normally to the address R, slip control is made in this case so that the read address advances to the address R-J one frame ahead. Further, the case where the write speed is slower than the read speed and the write address approaches the read address counterclockwise will be considered. Now, let us assume that when the read address comes to the last address R+J−1 of a certain frame, the write address is still at the address R+J+1 which is ahead of it by two addresses. Normally, the read address would advance to the address R+1. However, in this case, slip control is effected so that the read address is returned to the address R which is the first address of the initial frame.

Thus, when the write or read address comes within a predetermined range as one another, slip control is regularly made for each predetermined gap of divided data so that a predetermined amount of data is discarded or reread and matching is applied to the slightly different data transmitting speeds of the two digital signal systems. In such a manner, operation of a plesiochronous matching apparatus is generally performed.

The accuracy of the clock frequencies of the two systems performing plesiochronous matching operation varies within a permissible range and there is a fear that the relative relation between the clock frequencies of the two systems established till then may be completely reversed at the moment certain slip control is made. In order to apply effectively the matching in the worst condition as described above, it is necessary to maintain the minimum time period for slip control at more than a fixed value. More specifically, it is necessary that the difference between the write address and the read address after application of slip control should be more than the slip amount, for example, more than the amount for one frame measured in either of the clockwise and counterclockwise directions. Accordingly, by taking account of the write and read addresses, the capacity of a matching buffer memory needs to be more than the number of addresses for two frames plus one address.

If the threshold value for detection of a difference of the addresses is set at a point more distant than the adjacent address for the purpose of safety, it is necessary to further increase a memory capacity. In addition, it is difficult in the slip control to apply slipping from an arbitrary address to an address distant therefrom by one frame by counting a difference of the addresses. Therefore, the capacity of a matching buffer memory is selected to be an integer multiple of the frame capacity exceeding two frames if slip control is to be made for a frame unit. Further, an address fixing and allocating method in which the respective addresses of a matching buffer receive fixed bits of each frame unit data is adopted so that the respective gaps of the slip units always exist in fixed addresses regularly positioned, in a control buffer memory, which makes it easy to provide slip control.

Now, a conventional plesiochronous matching apparatus performing the above stated function will be described with reference to FIG. 2. FIG. 2 is a schematic block diagram showing the structure of a conventional plesiochronous matching apparatus. In the matching apparatus in FIG. 2, there is shown a case where a frame cycle is used as a slip unit for slip control.

Referring to FIG. 2, a plesiochronous matching apparatus has a structure in which first equipment and a second equipment are provided symmetrically with respect to a synchronizing control circuit 50 at the center of the Figure. The on-line equipment operates in the normal state, while the non-on-line equipment is a complementary equipment of the on-line equipment and operates in case of trouble and the like of the on-line equipment. In the following, the explanation is made with respect to an example in which the equipment represented by a suffix "a" acts as the on-line equipment and the equipment represented by a suffix "b" acts as the non-on-line equipment. Although those equipments represented by the suffixes "a" and "b" may operate in the reversed manner, the explanation of such a case is omitted because the operations of the reversed equipments is completely symmetrical to the following.

In the figure, the small letter a is attached to the on-line equipment and the signals related thereto and the small letter b is attached to the non-on-line equipment and the signals related thereto.

In FIG. 2, 10 indicates a data input terminal of a plesiochronous matching apparatus; 11 indicates an entered data signal; 12a and 12b indicate clock extracting circuits; 13a and 13b indicate extracted clock signals; 14a and 14b indicate frame extracting circuits; 15a and 15b indicate extracted frame signals; 16a and 16b indicate write address counters; 17a and 17b indicate write address signals; 18a and 18b indicate write address counter synchronizing output signals; 19a and 19b indicate write address counter external synchronizing input signals; 20a and 20b indicate matching buffer memory circuits; 21a and 21b indicate buffer control circuits; 22a and 22b indicate memory control signals; 30a and 30b indicate buffer memory read data signals; 31a and 31b indicate read address counters; 32a and 32b indicate read address signals; 33a and 33b indicate read address counter control signals; 34a and 34b indicate read address counter control input signals; 35a and 35b indicate read address counter synchronizing output signals; 36a and 36b indicate read address counter external synchronizing input signals; 40 indicates a switching circuit; 41 indicates an output data signal; 42 indicates a data output terminal of the plesiochronous matching apparatus; 43 indicates a clock signal input terminal on the read side; 44 indicates a clock signal on the read side; 45 indicates a frame signal input terminal on the read side; 46 indicates a frame signal on the read side; 50 indicates a synchronizing control circuit; 51 indicates a selection signal input terminal; 52 indicates a selection signal.

In the following, the operation of the circuit shown in FIG. 2 will be described. Although the following description is given particularly to the on-line equipment indicated with the small letter a, the non-on-line equipment indicated with the small letter b operates fundamentally in the same manner as in the on-line equipment and, therefore, the description thereof is omitted.

The input data signal 11 entered through the data input terminal 10 of the plesiochronous matching apparatus is applied to the clock extracting circuit 12a, the frame extracting circuit 14a and the matching buffer memory circuit 20a. The clock extracting circuit 12a extracts a clock signal from the input data signal 11 and applies the extracted write clock signal 13a to the frame extracting circuit 14a and the write address counter 16a. The frame extracting circuit 14a extracts a write frame timing signal based on the input data signal 11 and the write clock signal 13a and applies the extracted write frame timing signal 15a to the write address counter 16a. The write address counter 16a provides the write address signal 17a and the write address counter synchronizing output signal 18a based on the extracted write clock signal 13a and the extracted write frame signal 15a. The write address counter 16a operates periodically with a cycle longer than write frame cycle corresponding to the capacity of a plesiochronous buffer which, as mentioned before, usually corresponds to an integer multiple of the frame capacity. The parallel write address signal 17a consists of signal components having cycles longer than the write frame cycle and signal components having cycles equal to or shorter than the write frame cycle. The latter components always operate in synchronism with extracted write frame signal 15a. The write counter synchronizing output signal 18a, which has the above stated longest cycle, is provided according to the timing with which the write address counter 16a resets the output thereof. The write address counter external synchronizing input signal 19a provided from the synchronizing control circuit 50 is a signal for controlling the write address counter 16a and if this signal 19a is applied, the parallel output components of the write address counter 16a having longer cycles than the frame are forcedly reset irrespective of the amount of the output. The input data signal 11 applied to the matching buffer memory circuit 20a is written into the memory circuit 20a according to the write address signal 17a.

The read address counter 31a performs counting operation based on the read clock signal 44 applied from the read clock signal input terminal 43 and the read frame timing signal 46 applied from the read frame signal input terminal 45. The read address counter 31a provides the read address signal 32a to the matching buffer memory circuit 20a and the buffer control circuit 21a. This parallel read address signal 32a also contains signal component having cycles equal or shorter than the read frame cycle so as to perform the operation synchronizing with the read frame timing signal 46 and signal components having cycles longer than read frame cycle in the same manner as in the case of the write address signal 17a. The read address counter 31a provides the read counter synchronizing output signal 35a to the synchronizing control circuit 50 with the timing for resetting the output of the counter 31a, while parallel output components of the counter 31a having longer cycles than read frame cycle are forcedly reset by the read address counter external synchronizing input signal 34a applied from the synchronizing control circuit 50. Further, the read address counter 31a performs, in addition to the normal periodical counting operation, discontinuous increment or decrement operation with steps equivalent to the number of addresses related to the data for one frame, according to the instruction of the read address counter control input signal 34a.

The buffer control circuit 21a detects a relative address difference between the write address signal 17a and the read address signal 32a and when the difference of the addresses exceeds a predetermined threshold value, the buffer control circuit 21a applies to the synchronizing control circuit 50, the read address counter control signal 33a according to the relative approaching state. This read address counter control signal 33a indicates a discontinuous advance in the addresses for one frame when the write address comes up with the read address. On the contrary, when the read address comes up with the write address, the read address counter control signal 33a indicates a discontinuous return in the addresses for one frame. In addition, the buffer control circuit 21a applies the memory control signal 22a to the matching buffer memory 20a. The matching control signal 22a serves to control the matching buffer memory 20a, so that write operation of the input data signal 11 based on the write address signal 17a and read operation of the buffer memory read data signal 30a based on the read address signal 32a are performed without interference with each other.

The switching circuit 40 operates according to the selection signal 52 applied from the selection signal input terminal 51 so as to select the output of the first equipment or the output of the second equipment as the output of on-line equipment. More specifically, it selects the buffer memory read data signal 30a from the matching buffer memory 20a constituting the on-line equipment so that the selected buffer memory read data signal 30a is provided to the data output terminal 42 as the output data signal 41 of the plesiochronous matching apparatus. In the case where the second equipment with the reference character "b" is set to be on-line, the selected buffer memory read data signal 30b is provided to the data output terminal 42 instead of signal 30a.

The synchronizing control circuit 50 controls selectively either the on-line equipment or the non-on-line equipment in synchronism according to the selection signal 52 in the same manner as in the switching circuit 40 and applies from the on-line equipment the synchronizing signals as an external synchronizing signal to the non-on-line equipment and to the on-line equipment itself. In case where the first equipment with reference character "a" is selected the on-line equipment, the address counter control signal 33a applied from the on-line buffer control circuit 21a is selected and this signal is applied as the read address counter control input signals 34a and 34b to both of the on-line read address counter 31a and the non-on-line read address counter 31b. Consequently, the on-line read address counter 31a and the non-on-line read address counter 31b both operate under the control of the on-line buffer control circuit 21a. Further, the synchronizing output signal 18a from the on-line write address counter 16a and the synchronizing output signal 35a from the read address counter 31a are selected respectively. These synchronizing output signals 18a and 35a are applied to the corresponding non-on-line counters 16b and 31b as the external synchronizing input signals 19b and 36b, respectively. Thus, non-on-line write address counter 16b and the non-on-line read address counter 31b operate in synchronism with the corresponding on-line address counters 16a and 31a, respectively.

As described above, the plesiochronous matching apparatus includes the on-line equipment and the non-on-line equipment. The above stated conventional apparatus is connected so that the non-on-line write address counter 16b and the non-on-line read address counter 31b perform counting operation under the control of the on-line write address counter 16a and the on-line read address counter 31a, respectively, in synchronism with the write and read counters of the on-line equipment. As a result, if a trouble, such as in existence of the plesiochronous slip control to be performed, occurs in the on-line write address counter 16a or read address counter 31a to bring it into a malfunction state, the corresponding non-on-line counter synchronizing with the counter in trouble is also brought into the malfunction state. Accordingly, the conventional plesiochronous matching apparatus has a disadvantage that if the non-on-line equipment (standby state equipment) is selected after detection of a trouble in the on-line equipment, the same data trouble as in the on-line equipment exists in the newly selected on-line equipment which has been a standby (non-on-line) equipment before the switching transition. Another disadvantage is that if troubles are detected simultaneously in both of the on-line and non-on-line equipment, the plesiochronous matching apparatus is brought into an inoperable state since the on-line and non-on-line equipment operate in synchronism.

SUMMARY OF THE INVENTION

This invention is structured so that when an on-line equipment operates normally, a non-on-line equipment is set to a standby state in synchronism with the on-line equipment and after that, the synchronizing connection of both equipment is dissolved to operate the non-on-line equipment independently of the on-line equipment. Thus, in a plesiochronous matching apparatus of this invention, a trouble in the on-line equipment can be prevented from affecting the non-on-line equipment and if a trouble occurs in the on-line equipment, the non-on-line equipment normally operating can be selected instead of the on-line equipment.

Therefore, this invention makes it possible to realize a plesiochronous matching apparatus having high reliability in which a trouble in the on-line equipment can never affect the non-on-line equipment and if a trouble occurs in the on-line equipment, the normally operating non-on-line equipment can be selected instead.

These objects and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
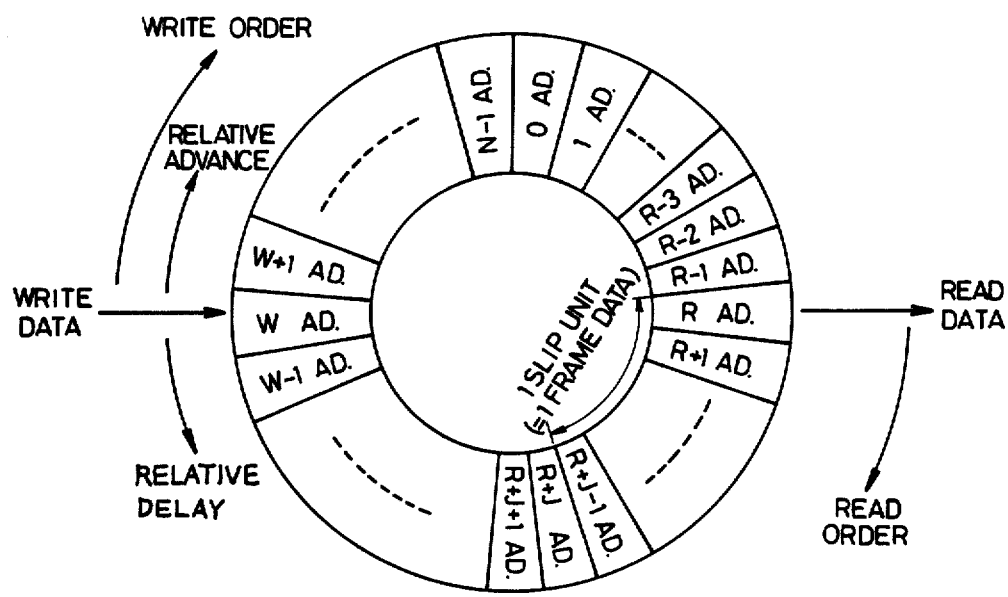
FIG. 1 is a schematic block diagram showing generally the operation of a plesiochronous matching apparatus.
Figure 2:
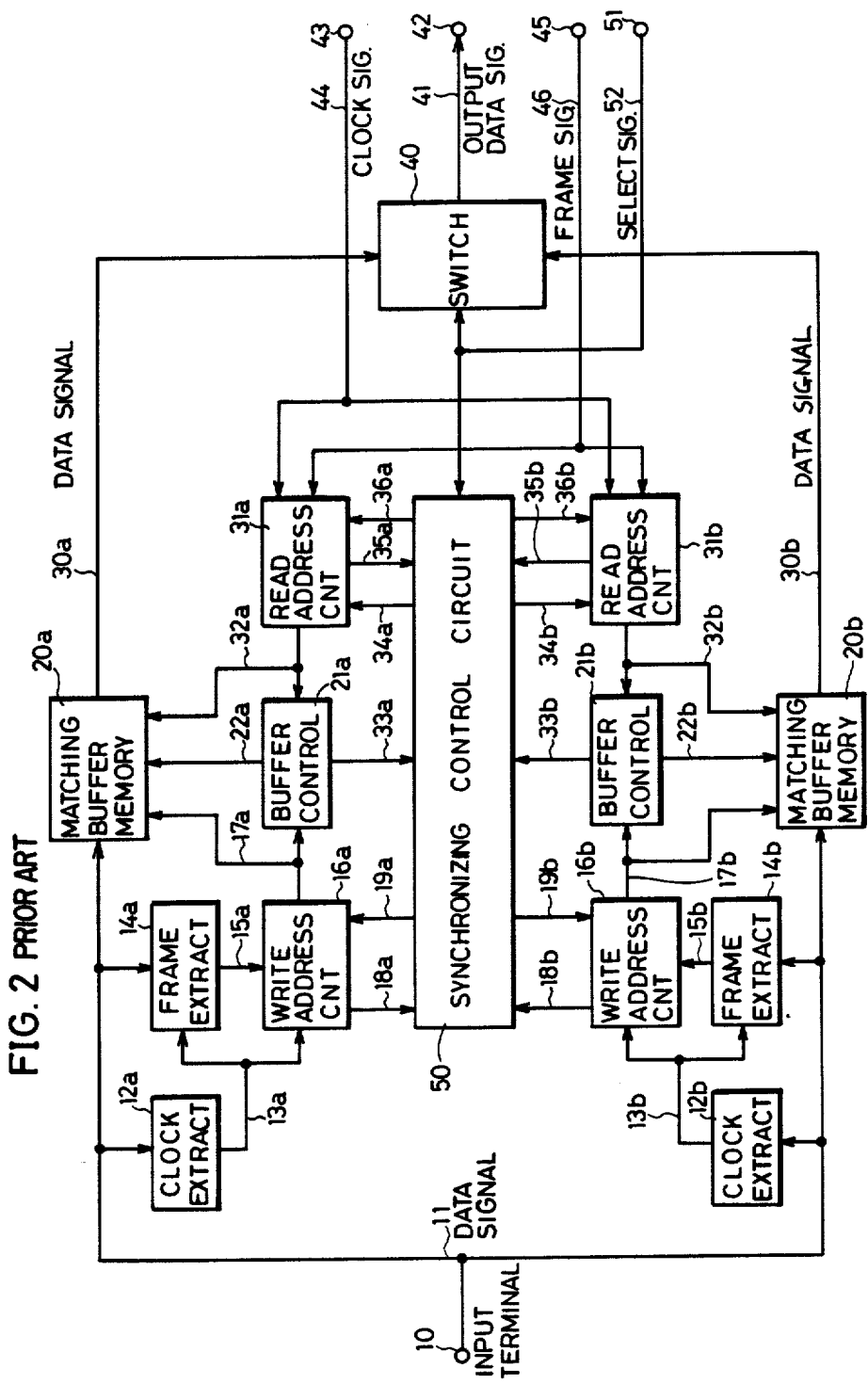
FIG. 2 is a block diagram showing the structure of a conventional plesiochronous mating apparatus.
Figure 3:
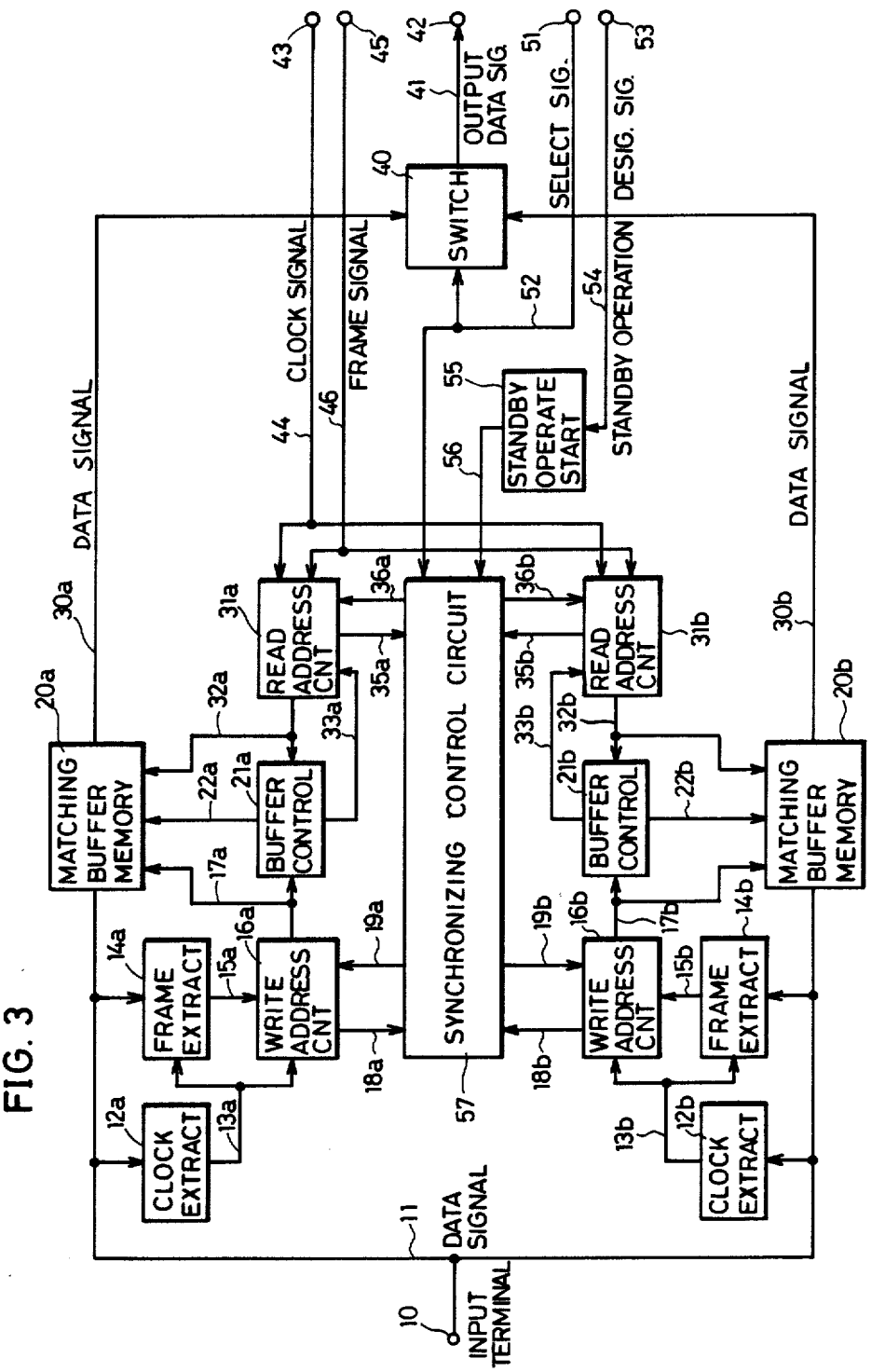
FIG. 3 is a block diagram showing the structure of an embodiment of the present invention.

FIG. 3 is a block diagram showing the structure of a plesiochronous matching apparatus in accordance with an embodiment of the present invention. In FIG. 3, the same reference characters as in the conventional apparatus in FIG. 2 indicate the same or corresponding portions. In the following, only the essential portions and the operation characterizing this invention will be described, the description of the same or corresponding portions as in the conventional apparatus in FIG. 2 being omitted.

Referring to FIG. 3, 53 indicates a standby operation designating signal input terminal; 54 indicates standby operation designating signal; 55 indicates a standby operation start detecting circuit; 56 indicates a standby operation start signal; and 57 indicates a synchronizing control circuit having a structure different from that of the above stated conventional apparatus. In the apparatus of this embodiment, as is different from the conventional apparatus, the read address counter control signals 33a and 33b provided from the buffer control circuit 21a and 21b are applied directly to the read address counters 31a and 31b, respectively.

In this embodiment, as in the illustration of FIG. 2, the small letter a is attached to the on-line equipment and the signals related thereto and the small letter b is attached to the non-on-line equipment and the signals related thereto.

As previously noted, this classification of the on-line and non-on-line equipment is not an absolute one but is made for convenience of explanation. Therefore, it does not matter if an on-line equipment and a non-on-line equipment are provided in the reversed manner.

If selection between the on-line equipment and the non-on-line equipment is made by an operator using an external switch or the like, the selection signal 52 is entered from the switching selection signal input terminal 51. This signal 52 is applied to the switching circuit 40 and the synchronizing control circuit 57. Based on the signal 52, the switching circuit 40 selects a signal designated to the on-line equipment (the data signal 30a in this case) out of the buffer memory read data signal 30a provided from the matching buffer memory circuit 20a and the buffer memory read data signal 30b provided from the matching buffer memory circuit 20b. Then, the selected data signal 30a is provided to the data output terminal 42 as the output data signal 41 of the plesiochronous matching apparatus.

On the other hand, the synchronizing control circuit 57 selects signals of the on-line equipment based on the switching selection signal 52. More specifically, the synchronizing control circuit 57 selects the write address counter synchronizing output signal 18a provided from the write address counter 16a and the read address counter synchronizing output signal 35a provided from the read address counter 31a and does not select the synchronizing output signals 18b and 30b provided from the write address counter 16b and the read address counter 31b, respectively.

The standby operation designating signal 54 entered through the standby operation designating signal input terminal 53 serves to designate the standby operation mode of the non-on-line equipment so that the non-on-line equipment performs the function of the on-line equipment instead thereof at any time. More specifically, the standby operation designating signal 54 is a signal independent of the switching selection signal 52 and when the on-line equipment operates normally, it serves to make the non-on-line equipment synchronize with the on-line equipment and to set the non-on-line equipment in the standby state. This designating signal 54 is entered by an operator using an external switch not shown. The standby start detecting circuit 55 checks the polarity of the standby operation designating signal 54, and detects a point at which this signal is changed into the enabled state, whereby the standby operation signal 56 is provided as output. The standby operation start detecting circuit 55 may be omitted by adjusting the level of the standby operation designating signal so that the standby operation designating signal 54 may be applied directly to the synchronizing control circuit.

Upon receipt of the standby operation start signal 56, after confirming the non-on-line equipment as being in normal condition and ready for on-line operation, the synchronizing control circuit 57 sets as synchronization executing flags, a write address counter synchronization setting flip-flop and a read address counter synchronization setting flip-flop contained in the circuit 57. Then, connection is made so that the write address synchronizing output signal 18a from the on-line write address counter 16a is applied as the write address counter external synchronizing input signal 19b of the non-on-line write address counter 16b and the read address counter synchronizing output signal 35a from the on-line read address counter 31a is applied as the read address counter external synchronizing input signal 36b of the non-on-line read address counter 31b. The write address counter synchronizing output signals 18a and 18b and the read address counter synchronizing output signals 35a and 35b are pulse signals each having a cycle corresponding to the matching buffer capacity. When these pulse signals are in the enabled state, the non-on-line write address counter 16b and the non-on-line read address counter 31b are reset respectively so as to make synchronization with the corresponding on-line counters 16a and 31a. At the time of synchronization of the non-on-line write address counter 16b and read address counter 31b with the corresponding on-line counters 16a and 31a, the synchronization executing flags of the corresponding write address counter synchronization setting flip-flop and the read address counter synchronization setting flip-flop contained in the synchronizing control circuit 57 are reset. Thus, no further synchronizing signal is applied from the respective on-line counters to the respective non-on-line counters until the flags are newly set by the standby operation start signal 56.

Figure 4:
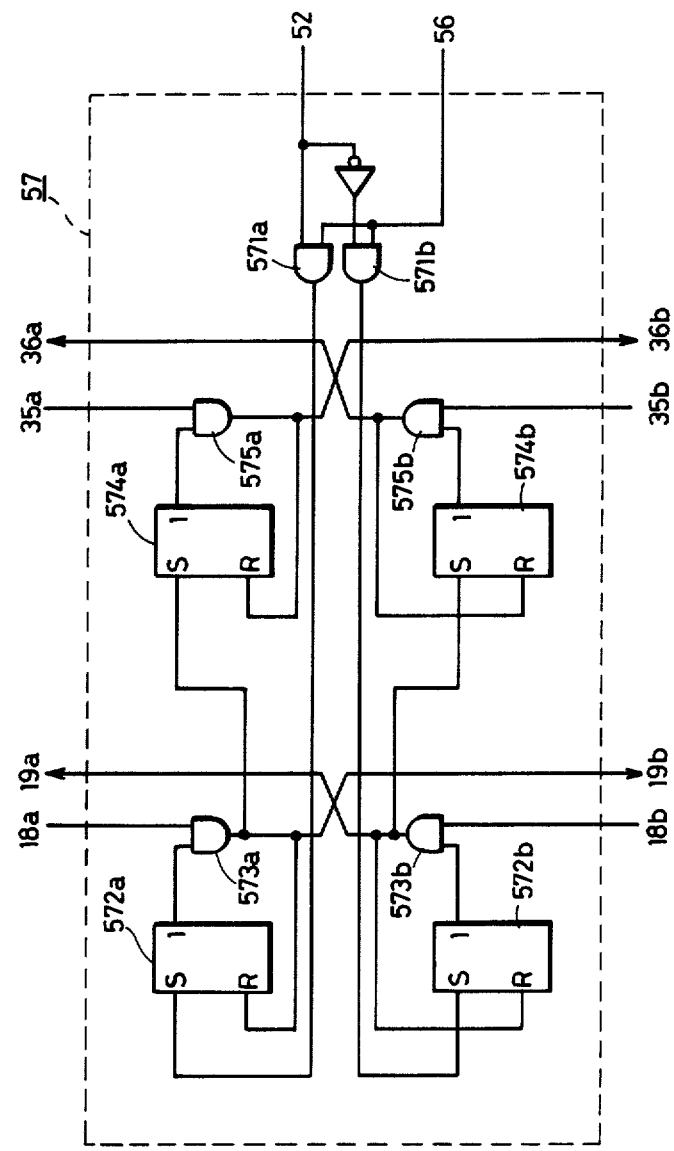
FIG. 4 is a block diagram showing an example of a concrete structure of a synchronizing control circuit 57 shown in FIG. 3.

A concrete example of the synchronizing control circuit 57 for performing the above described operation is shown in FIG. 4.

In the following explanation of FIG. 4, it is assumed that the circuit including the matching buffer memory circuit 20a is designated as the on-line equipment, in other words, the switching selection signal 52 is in the high level state.

In this case, the standby operation start signal 56 to be applied to the synchronizing control circuit 57 is supplied to the set terminal of the flip-flop 572a through the AND gate 571a. The flip-flop 572a is an address counter synchronization setting flip-flop and by the set output thereof, the AND gate 573a is brought into the enabled state. Consequently, the write address counter synchronizing output signal 18a flows through the AND gate 573a so as to be applied to the non-on-line write address counter 16b as the address counter external synchronizing input signal 19b. The output of the AND gate 573a is also applied to the set terminal of the flip-flop 574a. The flip-flop 574a is a read address counter synchronization setting flip-flop and by the set output of the flip-flop 574a, the AND gate 575a is brought into the enabled state. As a result, the read address counter synchronizing output signal 35a flows through the AND gate 575a so as to be applied to the non-on-line read address counter 31b as the read address counter external synchronizing input signal 36b. Thus, the non-on-line write address counter 16b and the non-on-line read address counter 31b are operated in synchronism with the on-line synchronizing output signals 18a and 35a, respectively.

Further, the output of the AND gate 573a is applied to the reset terminal of the flip-flop 572a and the output of the AND gate 575a is applied to the reset terminal of the flip-flop 574a. In consequence, when synchronization of the non-on-line write address counter 18b and the non-on-line read address counter 31b is effected, the flip-flops 572a and 574a are reset. Accordingly, the AND gate 573a brought into the enabled state by the set output of the flip-flop 572a and the AND gate 575a brought into the enabled state by the set output of the flip-flop 574a are both brought to the disabled state and, as a result, the non-on-line address counters 16b and 31b are detached from the on-line synchronizing output signals 18a and 35a.

Contrary to the above description, if the circuit including the matching buffer memory circuit 20b is designated as the on-line equipment, the selection signal 52 is in the low level state. As a result, in this case, the standby operation start signal 56 is applied to the flip-flops 572a and 574b through the AND gate 571b. The operation of the flip-flops 572b and 574b and the AND gates 573b and 575b is the same as in the above stated case and therefore, a detailed description thereof is omitted.

As described in the foregoing, when the on-line equipment operates normally, the non-on-line equipment is brought into the standby state in synchronism with the on-line equipment and then the synchronizing connection of both equipment is dissolved to operate the non-on-line equipment independently of the on-line equipment. Thus, if the non-on-line equipment instead of the on-line equipment is selected by the selection signal 52 when a trouble occurs, the non-on-line equipment can operate normally irrespective of the trouble of the on-line equipment.

Although in the above stated embodiment, a unidirectional digital transmitting system is described, the present invention is also applicable to a bidirectional digital transmitting system. Such a system can be easily realized by combining another set of similar equipment in the opposite direction. In that case, the extracted write clock signal and the extracted write frame signal on the write side of the opposite plesiochronous apparatus constituting one of the pair may be used as the read clock signal 44 and the read frame signal 46 shown in the above-stated embodiment. On the contrary, instead of the method for extracting the write clock signals 13a and 13b and the write frame signals 15a and 15b from the input data signal 11, on the write side a method can be adapted for entering the write clock signals and the write frame signals separately in the same manner as on the read side of the embodiment.

In addition, although in the above stated embodiment, an example is described using a frame cycle as a slip unit for plesiochronous slip control, it goes without saying that a slip unit is not limited to the frame cycle and a sample cycle unit or a multiframe unit combined with a unit having other periodicity can be adopted.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A plesiochronous apparatus for compensating for a difference between the data transmitting speeds of two digital signal systems at the time of communicating data between said two digital signal systems, said plesiochronous apparatus having a redundant configuration including at least two equipments of the same structure, that is first equipment functioning as a on-line-equipment, an input signal from one of said two digital signal systems being applied to both said first and said second equipments simultaneously, said first equipment and said second equipment each comprising:

buffer memory means for storing the data entered from said one of said two digital signal systems, for providing an elastic delay before putting out said data to the other of said two digital systems to ensure independent periodic frame-synchronized operations in each two digital signal systems, write address counter means, operating in synchronism with write frame timing of one of said two digital signal systems from which said write frame timing is derived, for designating a write address of said buffer memory means wherein the input data from said one of said two digital signal systems is to be written, and for providing a write synchronizing output signal, read address counter means, operating in synchronism with read frame timing of the other one of said two digital signal systems to which the said data is provided, for designating a read address from which the data of said buffer memory means is to be read, and for providing a read synchronizing output signal, buffer control means for incrementing or decrementing said read address by a second predetermined number of addresses according to a signed difference between said write address and said read address when the absolute value of said difference attains a first predetermined number of addresses irrespective of the control of another said buffer control means of said redundant configuration, said plesiochronous apparatus further comprising:

switching means connected in common to both of said first equipment and said second equipment, said switching means operable in response to a selection signal for making a selection between the data read from the buffer memory means of said first equipment and the data read from the buffer memory means of said second equipment, whereby said selected read data from sad on-line-equipment, whereby said selected read data from said on-line-equipment is provided to the other of said two digital signal systems, and synchronizing control means for connecting in synchronism the write synchronizing output signal and the read synchronizing output signal of said on-line-equipment to the write address counter means and the read address counter means of said non-on-line equipment, respectively, at the time of bringing said non-on-line equipment into a standby state for said on-line-equipment, and for dissolving said connection thereafter to permit said write address counters and said read address counters of both said on-line-equipment and said non-on-line equipment to operate independently thereafter.

2. Plesiochronous apparatus in a accordance with claim 1, wherein:

said buffer control means provides an output signal to said read address counter means, said synchronizing counter means further including means for establishing a standby operation mode of said non-on-line equipment for causing said non-on-line equipment to perform functions of said on-line-equipment when in said standby mode.

3. A plesiochronous apparatus in accordance with claim 2 further comprising standby start detecting circuit means for detecting a change in a standby operation designating signal to generate a control signal for effecting said standby operating mode.

4. A plesiochronous apparatus in accordance with claim 1, wherein said synchronizing control means comprises means for selectively receiving, out of the write synchronizing output signal and the read synchronizing output signal provided from the write address counter means and the read address counter means of said on-line equipment and the write synchronizing output signal and the read synchronizing output signal provided from the write address counter means and the read address counter means of said non-on-line equipment, said respective synchronizing output signals from said on-line equipment, based on said selection signal of said switching means when the buffer memory means of said on-line equipment is selected.

5. A plesiochronous apparatus in accordance with claim 4, wherein said synchronizing control means comprises means for connecting and applying said write synchronizing output signal and read synchronizing output signal received from said on-line equipment to the write address counter means and the read address counter means of said non-on-line equipment, respectively, as external synchronizing input signals, in response to an application of a standby start signal for bringing said non-on-line equipment into a standby state for said on-line equipment.

6. A plesiochronous apparatus in accordance with claim 5, wherein said synchronizing control means comprises means for forbidding the connection and application of said write synchronizing output signals and read synchronizing output signals from said on-line-equipment, immediately after said write synchronizing output signal and said read synchronizing output signal have been connected and applied as the external synchronizing input signals for said non-on-line equipment.

7. A plesiochronous apparatus in accordance with claim 6, wherein said synchronizing control means comprises first gate means for connecting the write synchronizing output signal from said first equipment as the external write synchronizing input signal for said second equipment, write synchronization setting flip-flop for opening and closing said first gate means, second gate means for connecting the read synchronizing output signal from said first equipment as the external read synchronizing input signal for said second equipment, and read synchronization setting flip-flop for opening and closing said second gate means.

8. A plesiochronous apparatus in accordance with claim 7, wherein said write synchronization setting flip-flop is set by said standby start signal to open said first gate means and is reset by the output signal of said first gate means.

9. A plesiochronous apparatus in accordance with claim 7, wherein said read synchronization setting flip-flop is set by the output signal of said first gate means to open said second gate means and is reset by the output signal of said second gate means.

10. A plesiochronous apparatus in accordance with claim 7, wherein said synchronizing control means comprises third gate means for connecting the write synchronizing output signal from said second equipment as the external write synchronizing input signal for said first equipment, a write synchronization setting flip-flop for opening and closing said third gate means, fourth gate means for connecting the read synchronizing output signal from said second equipment as the external read synchronizing input signal for said first equipment, a read synchronization setting flip-flop for opening and closing said fourth gate means, and fifth gate means for applying selectively based on said selection signal, said standby start signal to the write synchronization setting flip-flop and the read synchronization setting flip-flop of said first equipment or to the write synchronization setting flip-flop and the read synchronization setting flip-flop of said second equipment.

11. A plesiochronous apparatus for compensating for a difference between the data transmitting speeds of two digital signal systems at the time of communicating data between said two digital signal system, said plesiochronous matching apparatus having a redundant configuration including at least two equipments of the same structure, that is first equipment functioning as an on-line-equipment and second equipment functioning as a non-on-line equipment, an input signal from one of said two digital signal systems being applied to both said first and said second equipments simultaneously, said first equipment and said second equipment each comprising:

buffer memory means for storing the data entered from said one of said two digital signal systems, for providing an elastic delay before putting out said data to the other of said two digital systems to ensure independent periodic frame-synchronized operations in each of said two digital signal systems, write address counter means, operating in synchronism with write frame timing of one of said two digital signal systems from which said write frame timing is derived, for designating a write address of said buffer memory means wherein the input data a from said one of said two digital signal systems is to be written, and for providing a write synchronizing output signal, read address counter means, operating in synchronism with read frame timing of the other one of said two digital signal systems to which the said data is provided, for designating a read address from which the data of said buffer memory means is to be read, and for providing a read synchronizing output signal, buffer control means for incrementing or decrementing said address by a second predetermined number of addresses according to a signed difference between said write address and said read address when the absolute value of said difference attains a first predetermined number of addresses irrespective of the control of another said buffer control means of said redundant configuration, said plesiochronous matching apparatus further comprising:

switching means connected in common to both of said first equipment and said second equipment for making a selection between the data read from the buffer memory means of said first equipment and the data read from the buffer memory means of said second equipment, whereby said selected read data from said on-line-equipment, whereby said selected read data from said on-line-equipment is provided to the other one of said two digital signal system, and synchronizing control means for connecting in synchronism the write synchronizing output signal and the read synchronizing output signal of said on-line-equipment to the write address counter means and the read address counter means of said non-on-line equipment, respectively, at the time of bringing said non-on-line equipment into a standby state for said on-line-equipment, and for dissolving said connection thereafter to permit said write address counters and said read address counters of both said on-line-equipment and said non-on-line equipment to operate independently thereafter, said synchronizing counter means comprising first gate means for connecting the write synchronizing output signal from said first equipment as an external write synchronizing input signal for said second equipment, write synchronization setting flip-flop for opening and closing said first gate means, second gate means for connecting the read synchronizing output signal from said first equipment as an external read synchronizing input signal for said second equipment, and read synchronization setting flop-flop for opening and closing said second gate means.

12. In a plesiochronous apparatus for compensating for a difference between the data transmitting speeds of two digital signal systems at the time of communicating data between said two digital signal system, said plesiochronous apparatus having a redundant configuration including at least two equipments of the same structure, that is first equipment functioning as an on-line-equipment and second equipment functioning as a non-on-line equipment, an input signal from one of said two digital signal systems being applied to both said first and said second equipments simultaneously, said first equipment and said second equipment each including:

buffer memory means for storing the data entered from said one of said two digital signal systems, for providing an elastic delay before putting out said data to the other of said two digital systems to ensure independent periodic frame-synchronized operations in each of said two digital signal systems, write address counter means, operating in synchronism with write frame timing of one of said two digital signal systems from which said write frame timing is derived, for designating a write address of said buffer memory means wherein the input data from said one of said two digital signal systems is to be written, and for providing a write synchronizing output signal, read address counter means, operating in synchronism with read frame timing of the other one of said two digital signal systems to which the said data is provided, for designating a read address from which the data of said buffer memory means is to be read, and for providing a read synchronizing output signal, buffer control means for incrementing or decrementing said read address by a second predetermined number of addresses according to a signed difference between said write address and said read address when the absolute value of said difference attains a first predetermined number of addresses irrespective of the control of another said buffer control means of said redundant configuration, the improvement comprising:

switching means connected in common to both of said first equipment and said second equipment, said switching means operable in response to a selection signal for making a selection between the data read from the buffer memory means of said first equipment and the data read from the buffer memory means of said second equipment, whereby said selected read data from said on-line-equipment is provided to the other of said two digital signal systems, and synchronizing control means for connecting in synchronism the write synchronizing output signal and the read synchronizing output signal of said on-line-equipment to the write address counter means and the read address counter means of said non-on-line equipment, respectively, at the time of bringing said non-on-line equipment into a standby state for said on-line-equipment, and for dissolving said connection thereafter to permit said write address counters and said read address counters of both said on-line-equipment and said non-on-line equipment to operate independently thereafter.

* * * * *